Aug. 27, 1968     J. J. MATTHEWS     3,398,610

INSULATION END REMOVING TOOL

Filed May 15, 1967

INVENTOR.
JAMES J. MATTHEWS
BY *Jerome Bauer*

ATTORNEY

United States Patent Office 3,398,610
Patented Aug. 27, 1968

3,398,610
INSULATION END REMOVING TOOL
James J. Matthews, 14 Woodcrest Road,
Hicksville, N.Y. 11801
Filed May 15, 1967, Ser. No. 638,233
3 Claims. (Cl. 81—9.5)

ABSTRACT OF THE DISCLOSURE

A manually operable device comprising a body having a bore adapted to surround an insulated cable. The body being provided with cutting means located so as to simultaneously cut and strip the insulation upon rotation of the body.

---

The present invention relates to apparatus for stripping cable and more particularly to a tool for helically stripping insulation from the end of heavy wire or cable.

The problem of removing insulation from large diameter wire or cable particularly under conditions of field use is well known. In my U.S. Patent No. 3,204,495, issued Sept. 7, 1965, there is disclosed a device for stripping the insulation from a central portion of in use or strung wire or cable and describes a tool having a cable engaging portion which is designed to be removably clamped about the cable and a cutting element which, upon rotation of the device, initiates and continues helical stripping of the insulation. While such a device is suited, as well, for the removal of insulation from end or terminal sections of cable, it may in fact be too sophisticated and complex for such and other similar simpler jobs. For example, since terminal sections of cable are more readily available to the repairman or workingman, the opening and/or clamping means by which the tool is placed about the cable is unnecessary. It is, therefore, the prime object of this invention to provide a simple and economical tool designed for the stripping of end or terminal section of cable only by a novel cutting element.

As will be recalled from the previously mentioned patent, helical stripping tools are required to operate by causing the cutting element to simultaneously cut, lift and remove the insulation in a helical progression about the cable without biting into or scoring the cable or wire since damage to the cable alters not only its physical but electrical properties.

It is, therefore, another object of this invention to provide a device in which the cutting element is arranged, with respect to the cable engaging portion of the device and the cable itself, to maintain at least its working edge out of contact with the cable.

I also provide, as a feature of this invention, a novel cutting element which is easy to produce and easily and effectively removes insulation of varying depths and characteristics and which because of its structure and specific arrangement in the present device insures against damage to the cable.

Other objects and advantages of the present invention will be readily apparent from the structure and arrangements more fully described hereinafter with reference to the accompanying drawings in which.

Figure 1:
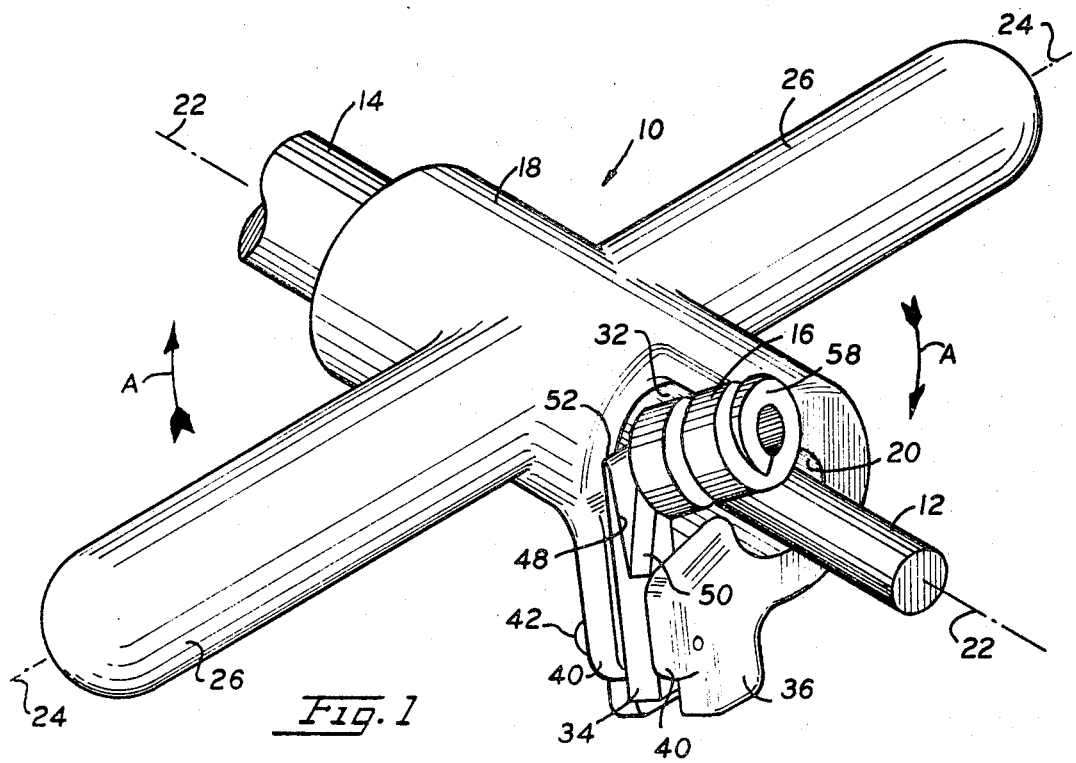
FIG. 1 is a perspective view of the present device positioned about a cable and having removed therefrom a portion of the insulation.

Referring now to FIG. 1, the device of the present invention is generally identified by the numeral 10 and is shown positioned about a terminal section of a cable 12 from which a portion of insulation 14 has been stripped as shown at 16.

The device 10 comprises a body 18 generally cylindrical in shape and having a central bore 20 running the entire length and defining the central axis 22 thereof. Extending along an axis 24 perpendicular to the central axis 22 and on opposite sides of the body 18 are a pair of arms 26 by which the device can be manually rotated about the cable 12.

It will be noted that the central axis 22 and the axis 24 form a plane 28 intersecting the body 18 and arms 26. In the further description, reference will be made to this plane 28 and to a plane 30 perpendicular thereto running also through the central axis 22 (or parallel to it, as is obvious) and to the four quadrants I–IV as viewed from the end of said body, as in FIG. 3.

At the rear end of the body 18, a portion thereof falling generally in quadrants II and III is cut away to define an opening 32 into which is fitted a cutting element 34. The cutting element 34 is mounted in a bracket 36 integrally formed with the body and extending therefrom at an angle to the plane 28 and parallel to and substantially to the side of plane 30 in quadrant III. Bracket 36 comprises a pair of opposed arms 40 between which the cutting element 34 is pivotally mounted on pin 42. A spring 44 is provided to bias the cutting element 34 to normally present its cutting edges inwardly of the body 18. Pin 42 is conveniently made removable so to enable easy replacement of the cutting element. In addition, a set screw 45 is provided for limiting the movement of the cutting element 34 caused by spring 44. The set screw will prevent the cutting element from entering the opening 32 beyond the required distance for operation and insure against its inadvertently cutting into the cable 12. It is obvious, however, that the device may be provided without a set screw or similar stop mechanism since the biasing of the cutting element will naturally be stopped in any event by the construction of the bracket 36.

Figure 4:
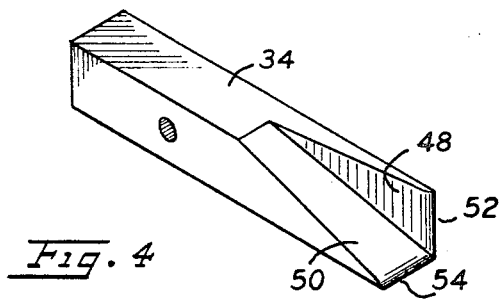
FIG. 4 is a perspective view of the cutting element according to the teachings of the present invention.

The cutting element 34, shown in an enlarged view in FIG. 4, is formed of a generally rectangular bar of steel or other suitable material which at one end is cut inwardly on adjacent side faces to form a pair of tapered chisel-like faces 48 and 50 having, respectively, honed edges 52 and 54 at right angles to each other. Returning to FIGS. 1 and 3, it will be seen that the cutting element is mounted in its bracket so as to present both edges 52 and 54 to the insulation. The edge 52 acts to cut into the insulation while edge 54 acts to lift and strip the insulation from the cable itself.

The cutting element 34 is further formed of a length sufficient so that when mounted in the bracket at least a portion of cutting edges 52 and 54 extends above the plane 28 formed through the central axis 22 and the back 56 of the cutting face 54 is generally tangential to the cable 12. This, and the fact that the mounting bracket 36 and consequently the entire cutting element 34 is completely to the side of the perpendicular plane 30, eliminates any possibility that the cutting element, either because of the biasing of spring 44 or the rotation of the device, would gouge, score or otherwise damage the cable during operation.

Figures 2, 3:
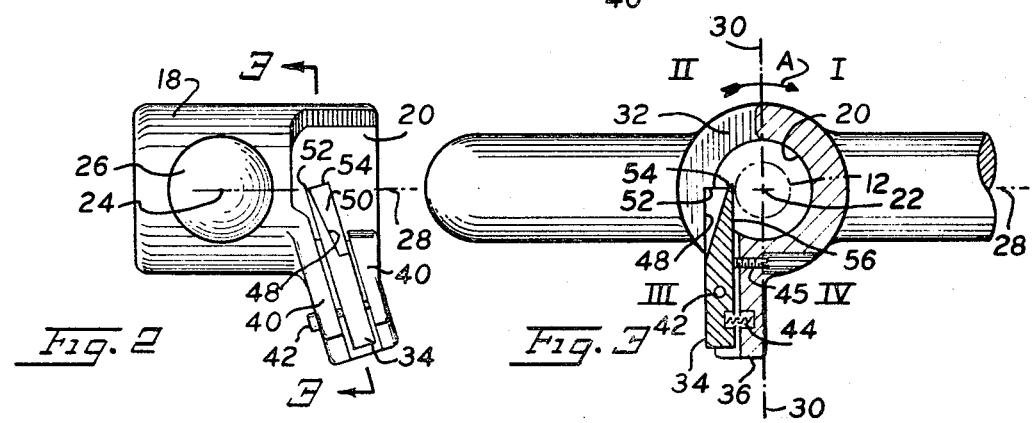
FIG. 2 is a side view of the device on a scale reduced from that of FIG. 1 and with the cable not shown.
FIG. 3 is a sectional view of the device taken along line 3—3 of FIG. 2.

For most general purposes, the amount by which edges 52 and 54 extend above the plane 28 is not critical. However, I have found that when stripping cable having a thin overwrapping of dielectric material, in addition to the normal insulation, a beneficial and unexpected result is obtained by locating the forward cutting edge 52 so that it substantially rests on or coincides with the plane 28 (as seen in FIG. 2). Under this condition, the dielectric overwrap is cleanly cut, lifted and removed in a similar manner, as is the insulation, and without the tearing and unraveling experienced in the past.

In operation, the device 10 is first slipped over the terminal section of cable 12 so that the edge of the cutting element abuts the edge 58 of the terminal section of insulation 16. The device is then rotated clockwise as shown by arrows A. Because of the tapered cutting surfaces, 48 and 50, and the angle at which the cutting element 34 is mounted with respect to the axis of the cable, the continued rotation of the device causes the cutting element to thread through the insulation 14 in a helical path about the cable, simultaneously stripping and causing the insulation to curl and be removed from the cable as shown in FIG. 1.

Upon the removal of the desired length of insulation 16, the device 10 is continued in clockwise rotation by the operator but prevented from helically traveling farther through the insulation by simply manually restraining further axial movement along cable 12. Thus, the forward edge 52 of the cutting element will produce a clean, sharp and square edge to the insulation. Upon final completion of the operation, the entire device is removed from the cable.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:
1. In a device for helically stripping insulation from about a cable, a cutting and removing element comprising a rectangular bar member having a pair of adjacent surfaces sloping angularly and terminating in cutting edges at right angles to each other, said member being mounted within said device so that one cutting edge is caused to cut helically through said insulation and the other cutting edge is caused to strip said insulation from said cable.

2. A device for removing insulation from end sections of cable or wire comprising a body having a bore therein adapted to surround said cable and define central axis, said body having a forward end and a rearward end, means for rotating said body, a cutting element located near said rearward end comprising a rectangular bar member having a pair of tapered surfaces sloping angularly disposed adjacent to each other, each of said tapered surfaces terminating in a cutting edge at right angles to the other, means mounting said cutting element at an angle to a first plane running through said central axis and said cutting element being substantially parallel to a second plane perpendicular to said first plane, said second plane being parallel to said central axis, at least a portion of said cutting edges extending into said bore a distance beyond said first plane so that one edge is caused to cut helically through said insulation and the other edge is caused to strip said insulation from said cable upon rotation of said body, and a surface of said cutting element extending substantially tangentially to the cable.

3. The device according to claim 2 wherein the cutting edge disposed to cut helically through the insulation substantially coincides with the first plane and at least a portion of the cutting edge disposed to strip the insulation extends through said first plane.

References Cited

UNITED STATES PATENTS

| | | |
|---|---|---|
| 1,165,176 | 12/1915 | Hornor. |
| 2,897,702 | 8/1959 | Ghiglia. |
| 3,057,232 | 10/1962 | Cornell. |
| 3,204,495 | 9/1965 | Matthews. |

FOREIGN PATENTS

| | | |
|---|---|---|
| 529,066 | 11/1940 | Great Britain. |
| 828,171 | 2/1960 | Great Britain. |

MILTON S. MEHR, *Primary Examiner.*